United States Patent
Booth

[11] 3,930,682
[45] Jan. 6, 1976

[54] SAFETY BELT TENSION RELIEVING APPARATUS

[75] Inventor: Frederick C. Booth, Birmingham, Mich.

[73] Assignee: Allied Chemical Corporation, New York, N.Y.

[22] Filed: Sept. 30, 1974

[21] Appl. No.: 510,814

[52] U.S. Cl. .......... 297/388; 200/61.58; 242/107.4
[51] Int. Cl.² ........................................ A62B 35/00
[58] Field of Search ................. 297/388, 385, 389; 242/107.4 A, 107.4 D, 107.4 R; 200/61.58 R, 61.58 A

[56] References Cited
UNITED STATES PATENTS

| | | | |
|---|---|---|---|
| 3,679,228 | 7/1972 | Seffimi | 297/388 X |
| 3,682,412 | 8/1972 | Kuszynski | 242/107.4 R |
| 3,700,184 | 10/1972 | Francis | 242/107.4 R |
| 3,741,495 | 6/1973 | Takada | 242/107.4 D |
| 3,771,742 | 11/1973 | Okada | 242/107.4 R |
| 3,804,192 | 4/1974 | Takada | 297/388 X |
| 3,817,473 | 6/1974 | Board | 297/388 X |
| 3,847,434 | 11/1974 | Weman | 297/388 X |

Primary Examiner—Francis K. Zugel
Attorney, Agent, or Firm—John P. Kirby, Jr.

[57] ABSTRACT

The apparatus is adapted to relieve tension on a shoulder belt of a vehicle safety belt system. The apparatus includes a pressure sensing means; a locking member; an electric actuating means; and a biasing means. The pressure sensing means is disposed in the back portion of a seat. The locking member may be a clamp bar or a pawl adapted to engage a ratchet wheel. The electric actuating means may be a solenoid which is mechanically connected to the clamp bar or pawl and electrically connected to the pressure sensing means. The electric actuating means is adapted to actuate the locking member to its locking position. The locking member counteracts the rewind mechanism of the retractor and relieves tension on the shoulder belt.

10 Claims, 6 Drawing Figures

SAFETY BELT TENSION RELIEVING APPARATUS

BACKGROUND OF THE INVENTION

This invention relates to a vehicle safety belt system adapted to restrain an occupant in his seat. Safety belt systems typically include a shoulder belt and a retractor having a rewind mechanism biased to rewind the shoulder belt into the retractor. More particularly, this invention relates to a shoulder belt, tension-relieving apparatus adapted to relieve the tension on the shoulder belt when in use by an occupant of a vehicle. The tension is produced by the rewind mechanism of the retractor.

The industry recognizes that the tension produced by the rewind mechanism of the shoulder belt retractor on the shoulder belt causes discomfort to an occupant using the shoulder belt of the vehicle safety belt system. Various apparatus have been proposed for relieving tension in vehicle shoulder belts. Such apparatus include those disclosed in U.S. Pat. No. 3,719,972 to Klink; No. 3,700,184 to Francis; No. 3,550,875 to Settimi; 3,771,742 to Okada; 3,695,546 to Takada; and 3,682,412 to Kuszynski; all of which differ in structure and operation from the present invention.

SUMMARY OF THE INVENTION

The invention is an improvement for use in a vehicle safety belt system adapted to restrain an occupant in a vehicle seat. The safety belt system includes a shoulder belt and a retractor. The retractor has a rewind mechanism biased to rewind the shoulder belt into the retractor. The generic invention is a shoulder belt, tension-relieving apparatus which includes: a pressure sensing means; a locking means; an electric actuating means; and a biasing means.

The pressure sensing means is disposed in the back portion of a vehicle seat adjacent to the back of the seated occupant. The pressure sensing means is adapted to sense a condition when the seated occupant is leaning against the back portion of his seat. The locking member is disposed adjaceent to a portion of the safety belt and has a locking position and an unlocking position. The locking member is adapted to be actuated from its unlocking position to its locking position. In its locking position, the locking member prevents further rewinding of the shoulder belt into the retractor. The electric actuating means is mounted adjacent to the locking member. The electric actuating means is adapted to actuate the locking member to its locking position and thereby relieve the tension on the shoulder belt produced by the rewind mechanism of the retractor. The electric actuating means is mechanically connected to the locking member and electrically connected to the pressure sensing means. The biasing means biases the locking member in its unlocking position.

Two embodiments of the shoulder belt, tension-relieving apparatus are disclosed. In a first embodiment of the generic invention, the locking member is a clamp bar. In the first embodiment, the apparatus further includes a backing surface, disposed on the opposite side of the shoulder belt from the clamp bar. In its locking position, the clamp bar is adapted to press a portion of the shoulder belt against the backing surface to prevent further rewinding of the shoulder belt and thereby relieve tension on the shoulder belt. In the first embodiment, the shoulder belt, tension-relieving apparatus may be mounted adjacent to the retractor or remote from the retractor.

In a second embodiment of the apparatus, the locking member is a pawl. In the second embodiment, the apparatus further includes a ratchet wheel adapted to be engaged by the pawl to prevent further rewinding of the shoulder belt into the retractor and thereby relieve tension.

DETAILED DESCRIPTION

The invention is an improvement for use in a vehicle safety belt system adapted to restrain an occupant in a vehicle seat. The safety belt system includes a shoulder belt and a retractor. The retractor has a rewind mechanism biased to rewind the shoulder belt into the retractor. The improvement is a shoulder belt, tension-relieving apparatus.

Figure 1:
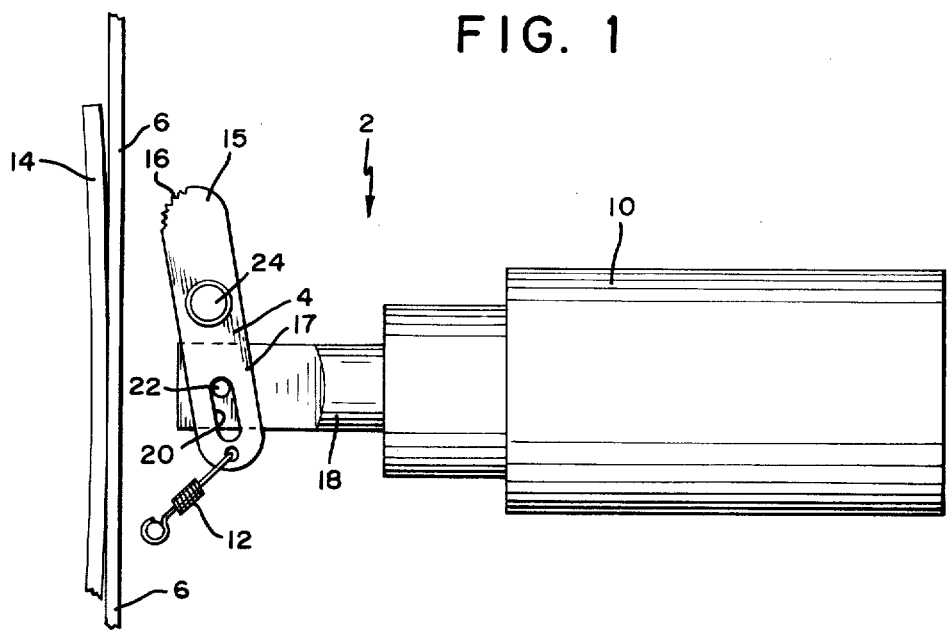
FIG. 1 is a simplified, schematic illustration of a first embodiment of the shoulder belt, tension-relieving apparatus, in its unlocking position.
Figure 2:
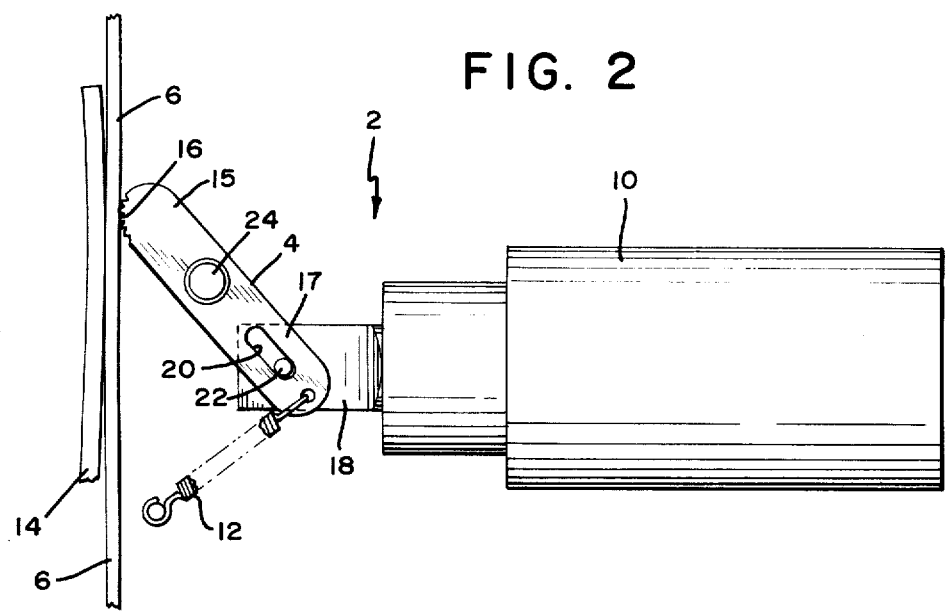
FIG. 2 is a simplified, schematic illustration of the first embodiment shown in FIG. 1, but FIG. 2 shows apparatus in its locking position.
Figure 3:
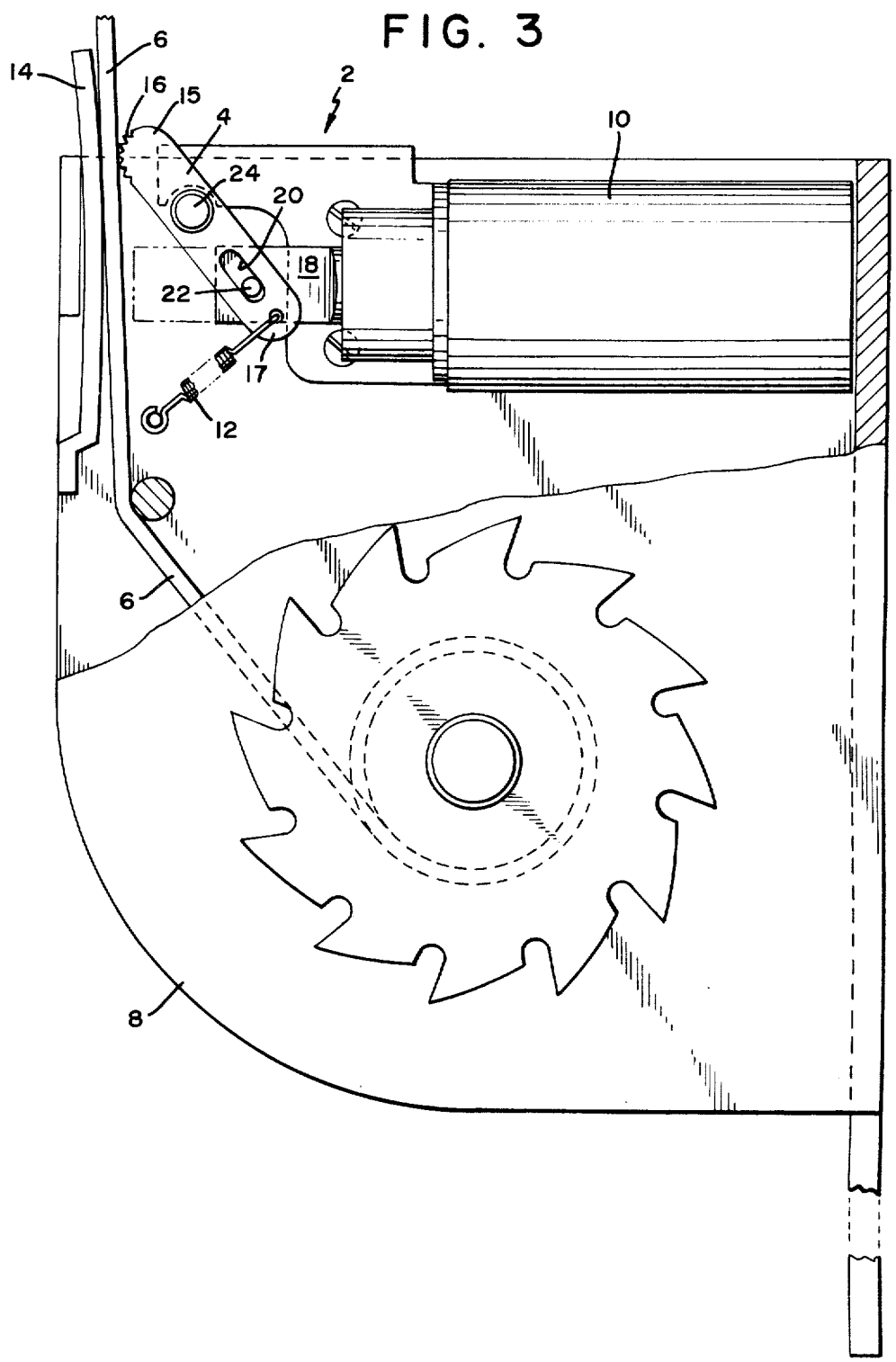
FIG. 3 is an illustration of the first embodiment of this invention disposed in a safety belt retractor.
Figure 5:
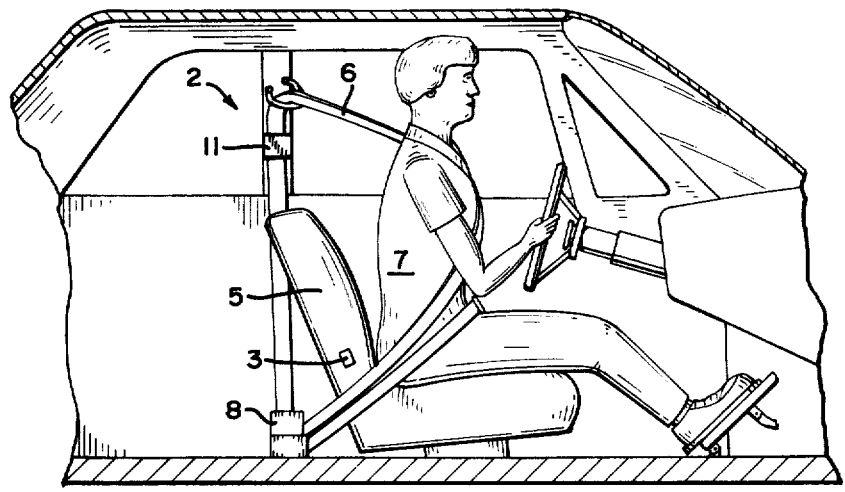
FIGS. 5 and 6 are simplified illustrations, for both the first and second embodiments, showing a portion of the apparatus, the pressure sensing means, in a vehicle.
Figure 6:
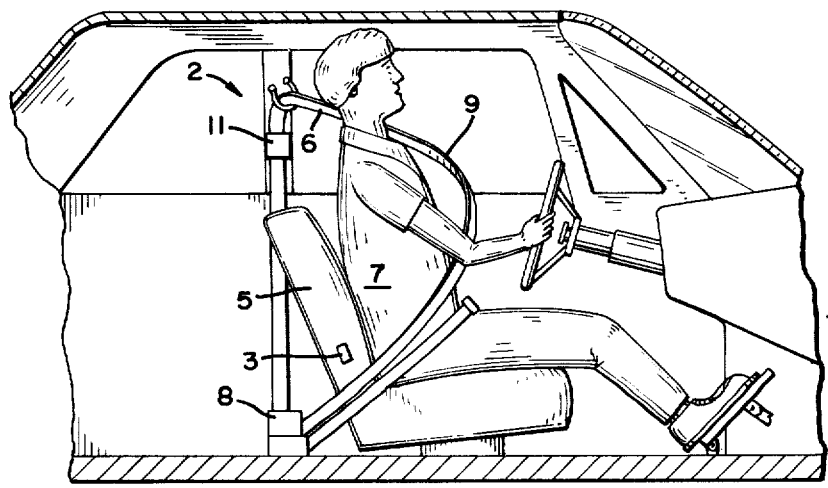

Referring to FIGS. 1 – 3, a first and preferred embodiment of the shoulder belt, tension-relieving apparatus is referred to generally by the numeral 2. The first embodiment 2 of the shoulder belt, tension-relieving apparatus includes: a pressure sensing means 3, shown in FIGS. 5 and 6; a locking member; an electric actuating means; and a biasing means. Referring to FIGS. 5 and 6, the pressure sensing means 3, such as a pressure sensitive switch, is embedded in the back portion 5 of a vehicle seat, preferably adjacent to the lower back of a seated occupant 7. The pressure sensing means 3 is adapted to sense a condition when the seated occupant 7 is leaning against the back portion 5 of his seat.

Referring to FIGS. 1 – 3, the locking member is a clamp bar 4 mounted adjacent to a shoulder belt 6. The clamp bar 4 has a locking position, shown in FIG. 2, and an unlocking position, shown in FIG. 1. The clamp bar 4 is adapted to be actuated from its unlocking position (FIG. 1) to its locking position (FIG. 2). In its locking position (FIG. 2) the clamp bar 4 prevents further rewinding of the shoulder belt 6 into a retractor 8, shown in FIG. 3 or in FIGS. 5 and 6. The electric actuating means may be a solenoid 10 which is mounted adjacent to the clamp bar 4. The electric actuating means, solenoid 10, is mechanically connected to the clamp bar 4 and electrically connected to the pressure sensing means 3. The solenoid 10 is triggered by the pressure sensing means 3 (FIGS. 5 and 6) when the seated occupant 7 leans against the back portion 5 of his seat. The solenoid 10 is adapted to actuate the clamp bar 4 to its locking position (FIG. 2) and thereby relieve the tension on the shoulder belt 6 produced by a rewind mechanism (not shown) in the retractor 8. The biasing means may be a tension spring 12 which biases the clamp bar 4 in its unlocking position (FIG. 1).

The first embodiment 2 further includes a backing surface 14 disposed on the opposite side of the shoulder belt 6 from the clamp bar 4. Referring to FIG. 2, in its locking position, the clamp bar 4 is adapted to press a portion of the shoulder belt 6 against the backing surface 14 to prevent further rewinding of the shoulder belt 6. Such pressure by the clamp bar 4 on the shoulder belt 6 counteracts the force of the rewind mechanism (not shown) in the retractor 8 and thereby relieves tension on the shoulder belt 6. The primary embodiment 2 of the shoulder belt, tension-relieving apparatus may be arranged adjacent to or within the retractor 8, as shown in FIG. 3, or remote from the retractor 8, as shown in FIGS. 1 and 2, in a separate housing 11, shown in FIGS. 5 and 6.

Referring to FIGS. 1 - 3, the clamp bar 4 preferably has a clamping portion 15 near one end thereof and an actuated portion 17 near the opposite end thereof. The clamping portion 15 has a knurled surface 16. The knurled surface 16 is adapted to clamp against a portion of the shoulder belt 6 when the clamp bar 4 is in its locking position. The solenoid 10 has a plunger 18 which is mechanically connected to the actuated portion 17 of the clamp bar 4. The clamp bar 4 is actuated by movement of the plunger 18. The plunger 18 has a unlocking position, shown in FIG. 1, in which the plunger 18 is extended out of the solenoid 10, and a locking position, shown in FIG. 2, in which the plunger 18 is partially withdrawn into the solenoid 10.

The actuated portion 17 of the clamp bar 4 has an elongated slot 20. The plunger 18 has a pin 22 extending from the plunger 18 into the elongated slot 20 of the clamp bar 4. Thus, the actuated portion of the clamp bar 4 is engaged by the plunger 18 of the solenoid 10. The pin 22 is adapted to move within the slot 20. Referring to FIG. 1, when the clamp bar 4 is in its nonactuated position, the pin 22 is in the upper portion of the slot 20. Referring to FIG. 2, when the clamp bar 4 is moved to actuated position, the pin 22 slides to the lower portion of the slot 20. Referring to FIGS. 1 - 3, the clamp bar 4 has a pivot pivot point 24 disposed between the clamping portion and the actuated portion of the clamp bar.

Figure 4:
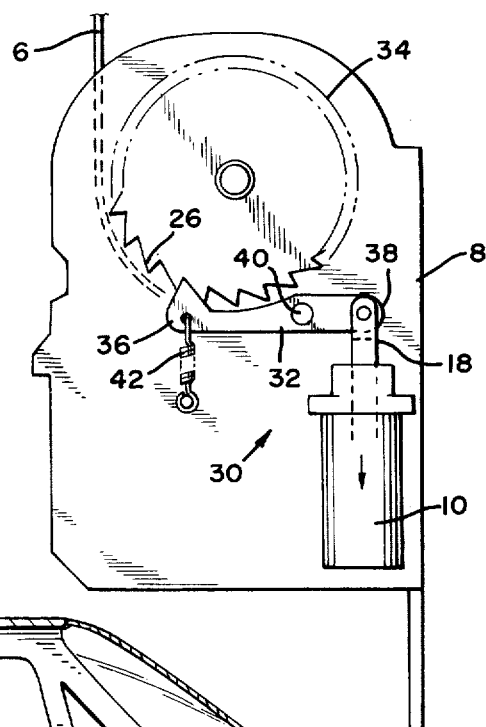
FIG. 4 is a simplified, schematic illustration of a second embodiment of this invention in its locking position.

Referring to FIG. 4, a second embodiment of the shoulder belt, tension-relieving apparatus is referred to generally by the numeral 30. The second embodiment 30 of the shoulder belt, tension-relieving apparatus includes: a pressure sensing means 3, shown in FIGS. 5 and 6; a locking member; an electric actuating means; and a biasing means.

Referring to FIGS. 5 and 6, the pressure sensing means 3, such as a pressure sensitive switch, is embedded in the back portion 5 of a vehicle seat, preferablly adjacent to the lower back of the seated occupant 7. Referring to FIG. 4, the locking member is a pawl 32 disposed adjacent to a portion of the safety belt. The second embodiment 30 further includes a ratchet wheel 34 adapted to be engaged by the pawl 32 to prevent further rewinding of the shoulder belt 6 into the retractor 8 and thereby relieve tension. The pawl 32 and ratchet wheel 34 preferably are separate members from another ratchet wheel and pawl combination (not shown) sometimes used in safety belt retractors 8 for locking the retractor 8 against unwinding in the event of emergency conditions, such as collision. The ratchet wheel 34 of the present invention has ratchet teeth 26 adapted to be engaged by pawl 32. The ratchet wheel 34 is rigidly connected to a reel of the retractor 8 on which the shoulder belt 6 is wound.

The pawl 32 has a locking position and an unlocking position. FIG. 4 shows the pawl 32 in its locking position engaging the ratchet wheel 34. The pawl 32 is adapted to be actuated from its unlocking position to its locking position. In its locking position, the pawl 32 in combination with the ratchet wheel 34, stops rotation of the reel and thereby prevents further rewinding of the shoulder belt 6 into the retractor 8. The electric actuating means may be a solenoid 10 which is mounted adjacent to the pawl 32. The solenoid 10 has a plunger 18 similar to that described in reference to the first embodiment 2. The pawl 32 has an engaging portion 36 near one end thereof, adapted to engage the ratchet teeth 26, and an actuated portion 38 near the opposite end thereof. The pawl 32 also has a pivot point 40 located between the engaging portion 36 and the actuating portion 38.

The plunger 18 is connected to the actuated portion 38 of the pawl 32. The plunger 18 has an unlocking position in which the plunger 18 is extended out of the solenoid 10, and a locking position, shown in FIG. 4, in which the plunger 18 is partially withdrawn into the solenoid 10. The plunger 18 may have a pin connected to an elongated slot in the actuated portion 38 of the pawl 32. The solenoid 10 is adapted to actuate the pawl 32 to its locking position and thereby relieve tension on the shoulder belt 6 produced by the rewind mechanism (not shown) of retractor 8. The biasing means may be a tension spring 42 which biases the pawl 32 in its unlocking position.

In operation, referring to FIGS. 5 and 6, both the first embodiment 2 and the second embodiment 30 are triggered into operation when the seated occupant 7 leans back far enough so that the small of his back presses against the back portion 5 of his seat, and against the pressure sensing means 3 therein. The pressure exerted by the small of the seated occupant's back against the pressure sensing means 3 produces a signal from the pressure sensing means 3 which triggers the electric actuating means, which moves the locking member, either the clamp bar 4 of the first embodiment 2 or the pawl 32 of the second embodiment 30, into its locking position, thereby opposing further rewinding of the shoulder belt 6. Referring to FIG. 5, as the sealed occupant 7 leans back in his seat, the lower back of the seated occupant 7 presses against the lower portion of the seat back 5 and against the pressure sensing means 3 before the upper back of the seated occupant 7 reaches the upper portion of the seat back 5. Referring to FIG. 6, when the upper back of the seated occupant 7 reaches the seat back 5, a small amount of slack 9 (about 2-6 inches) is produced in the shoulder belt 6 because the locking action by the locking member had taken place a short interval of time (a fraction of a second or a few seconds) prior thereto. In other words, the locking action on the shoulder belt 6 takes place when the lower back of the seated occupant 7 leans against the back portion 5 of the seat, rather than when the upper back of the seated occupant 7 leans against the back portion 5 of the seat. Examples of a pressure sensing means 3 adapted for use with this invention are disclosed in U.S. Pat. Nos.; 3,784,352 to Fontaine; 3,718,791 to Szablowski; and 3,784,769 to Bryll.

The shoulder belt, tension-relieving apparatus of this invention provides a simple, effective, easy to use, easy to manufacture, easy to install apparatus for relieving the tension of the shoulder belt when in use by a seated occupant, either a passenger or a driver.

I claim:

1. In a vehicle safety belt system adapted to restrain an occupant in a vehicle seat, the safety belt system including a shoulder belt and a retractor having a rewind mechanism biased to rewind the shoulder belt on a reel of the retractor, the improvement of a shoulder belt, tension-relieving apparatus adapted for relieving tension on the shoulder belt by the rewind mechanism of the retractor, said shoulder belt tension-relieving apparatus comprising:

a pressure sensing means disposed in the back portion of the seat adjacent to the back of the seated occupant, said pressure sensing means adapted to sense a condition when the seated occupant is leaning against the back portion of his seat;

a locking member disposed adjacent to a portion of the safety belt, having a locking position and an unlocking position and being adapted to be actuated from its unlocking position to its locking position, said locking member in its locking position preventing further rewinding of the shoulder belt into the retractor;

an electric actuating means mounted adjacent to said locking member, mechanically connected to said locking member and electrically connected to said pressure sensing means, said electric actuating means actuating said locking member to its locking position to thereby relieve the tension on said shoulder belt produced by the rewind mechanism of the retractor in response to said pressure sensing means sensing said occupant leaning against said back; and a biasing means biasing said locking member in its unlocking position.

2. The shoulder belt tension-relieving apparatus of claim 1 wherein: said electric actuating means is a solenoid having a plunger connected to said locking member.

3. The shoulder belt tension-relieving apparatus of claim 2 and further comprising: a backing surface disposed on the opposite side of said shoulder belt from said locking member.

4. The shoulder belt tension relieving apparatus of claim 3 wherein: said locking member is a clamp bar adapted to press a portion of said shoulder belt against said backing surface to prevent further rewinding of said shoulder belt.

5. The shoulder belt tension relieving apparatus of claim 4 wherein: said clamp bar has a clamping portion and an actuated portion, said clamping having a knurled surface adapted to clamp against said shoulder belt, said actuated portion being engaged by said plunger of said solenoid.

6. The shoulder belt tensions-relieving apparatus of claim 5 wherein: said actuated position of said clamping bar has an elongated slot; and said plunger of said solenoid has a pin extending from said plunger into said slot of said clamp bar, said pin thereby mechanically connecting said plunger to said clamping bar.

7. The shoulder belt tension-relieving apparatus of claim 1 wherein: said locking member is a locking pawl.

8. The shoulder belt tension-relieving apparatus of claim 7 and further comprising: a ratchet wheel connected to the reel of the retractor and adapted to be locked by said locking pawl.

9. In a vehicle safety belt system adapted to restrain an occupant in a vehicle seat, the safety belt system including a shoulder belt and a retractor having a rewind mechanism biased to rewind the shoulder belt on a reel of the retractor, the improvement of a shoulder belt, tension-relieving apparatus adapted for relieving tension on the shoulder belt by the rewind mechanism of the retractor, said shoulder belt tension-relieving apparatus comprising:

a pressure sensing means disposed in the back portion of the seat adjacent to the back of the seated occupant, said pressure sensing means adapted to sense a condition when the seated occupant is leaning against the back portion of his seat;

a locking member disposed adjacent to a portion of the safety belt having a locking position and an unlocking position and being adapted to be actuated from its unlocking position to its locking position, said locking member in its locking position preventing further rewinding of the shoulder belt into the retractor;

an electric actuating means mounted adjacent to said locking member, mechanically connected to said locking member and electrically connected to said pressure sensing means, said electric actuating means actuating said locking member to its locking position to thereby relieve the tension on said shoulder belt produced by the rewind mechanism of the retractor; in response to said pressure sensing means sensing said occupant leaning against said back;

a biasing means biasing said locking member in its unlocking position; and a backing surface disposed on the opposite side of said shoulder belt from said locking member; wherein:

said electric actuating means is a solenoid having a plunger connected to said locking member;

said locking member is a clamp bar adapted to press a portion of said shoulder belt against said backing surface to prevent further rewinding of said shoulder belt, said clamp bar having a clamping portion and an actuated portion, said clamping portion having a knurled surface adapted to clamp against said shoulder belt, said actuated portion being engaged by said plunger of said solenoid; said actuated portion of said clamping bar has an elongated slot; and said plunger of said solenoid has a pin extending from said plunger into said slot of said clamp bar, said pin thereby mechanically connecting said plunger to said clamping bar.

10. In a vehicle safety belt system adapted to restrain an occupant in a vehicle seat, the safety belt system including a shoulder belt and a retractor having a rewind mechanism biased to rewind the shoulder belt on a reel of the retractor, the improvement of a shoulder belt, tension-relieving apparatus adapted for relieving tension on the shoulder belt by the rewind mechanism of the retractor, said shoulder belt tension-relieving apparatus comprising:

a pressure sensing means disposed in the back portion of the seat adjacent to the back of the seated occupant, said pressure sensing means adapted to sense a condition when the seated occupant is leaning against the back portion of his seat;

a locking pawl disposed adjacent to a portion of the safety belt, having a locking position and an unlocking position and being adapted to be actuated from its unlocking position to its locking position, said locking member in its locking position preventing further rewinding of the shoulder belt into the retractor, said locking pawl having an engaging portion near one end thereof and an actuated portion near the opposite end thereof;

an electric actuating means mounted adjacent to said locking member, mechanically connected to said locking member and electrically connected to said pressure sensing means, said electric actuating means actuating said locking member to its locking position to thereby relieve the tension on said shoulder belt produced by the rewind mechanism of the retractor; in response to said pressure sensing means sensing said occupant leaning against said back;

a biasing means biasing said locking member in its unlocking position; and a ratchet wheel connected to the reel of the retractor and adapted to be engaged by said engaging portion of said locking pawl; and wherein:

said electric actuating means is a solenoid having a plunger connected to said actuated portion of said locking pawl.

* * * * *